UNITED STATES PATENT OFFICE.

ORAZIO LUGO, OF NEW YORK, N. Y.

PROCESS OF MANUFACTURING ILLUMINATING-GAS.

SPECIFICATION forming part of Letters Patent No. 257,447, dated May 2, 1882.

Application filed April 7, 1882. (No specimens.)

*To all whom it may concern:*

Be it known that I, ORAZIO LUGO, of the city, county, and State of New York, have invented certain new and useful Improvements in the Process of Manufacturing Illuminating-Gas; and I do hereby declare that the following is a description of the invention.

In the process of manufacturing illuminating-gas with a mixture of hydrogen and carbonic oxide, light hydrocarbons obtained by fractional distillation of crude petroleum are generally used to "carburet" the non-luminous gas derived from the decomposition of watery vapors in the presence of highly-heated carbon.

The most successful process of making water-gas is the following: In a cupola coal is rendered incandescent. Then steam is introduced and the products—hydrogen and carbonic oxide—collected in a special holder. These operations are alternately repeated by using, first, a blast of air to raise the temperature of the coal in the cupola, letting the products escape, then introducing steam and collecting the products. The latter are technically known as "hydrogen gas." The hydrogen gas from the special holder is then conveyed to apparatus called "carburetors," where light hydrocarbons—such as benzine or naphtha—are also introduced and heated by means of steam in order to prevent the temperature of the liquid from lowering, and to produce an atmosphere of hydrocarbon vapors, so that when the hydrogen gas is passed through the carburetor it may become saturated with the hydrocarbon vapor and carry it mechanically to and into chambers or retorts heated to a high temperature. These chambers or retorts are known as "benches." It is in these heated benches that the chemical combination of a part of the carbon of the hydrocarbon vapors of the naphtha and the free hydrogen of the hydrogen gas takes place, and the result is what is known as "fixed" illuminating-gas. As the fixed gas leaves the benches it passes through the hydraulic main to the condenser; thence to the "scrubber," where it is brought in contact with water; thence to the purifying-boxes containing lime; thence to the holder, where the gas is ready for consumption. The illuminating-gas thus produced is of a very superior quality as regards its photometric power and the absence of deleterious compounds, when compared with illuminating-gas made by the destructive distillation of coal.

The objects of my invention are to enable the gas-manufacturer, first, to make a gas of a constant photometric power; second, to make a gas which, when perfected, is free from light hydrocarbon vapor; third, to employ either light or heavy hydrocarbons, such as crude petroleum, thereby producing a better product at a lower cost than can be obtained by the use of a mere fraction of the distilled product of such hydrocarbons—as, for example, naphtha.

The invention consists generally in introducing into a highly-heated chamber liquid hydrocarbons and the products of the decomposition of watery vapors produced by incandescent coal, known as "water-gas" or "hydrogen gas," thus carbureting the latter, then fixing the mixture in a separate hot retort or bench; and to this end my invention consists specifically in decomposing liquid hydrocarbons in a highly-heated chamber or carburetor in the presence of water-gas, or passing water-gas through said chamber at the same moment the hydrocarbon oil (and especially crude petroleum) is being decomposed, and afterward heating the mixed gas in benches. The fixed gas thus obtained is then washed and purified.

To carry my invention into effect the apparatus now employed to manufacture the gas need not be changed, except by such modification of the carburetor as will provide means for heating it to a very high temperature, (red heat,) the carburetor being provided with means for introducing liquid hydrocarbons and water-gas in requisite proportions. For example, for a gas of high illuminating-power, for every one thousand cubic feet of water-gas from three to five gallons of hydrocarbon oil may be used, taking care to keep the chamber highly heated, so that the hydrocarbon may be instantaneously decomposed as it is admitted to the chamber, thereby carbureting the non-luminous gas without leaving any undecomposed oil in the chamber. The mixed gases then pass into the heated retorts or benches. For my carburetor I may use one or more iron vessels connected together, with means to heat them to a red heat, and allow the hydrocarbon to percolate in the first vessel of the series in such quantity relatively to the amount of water-gas as may be necessary, or in about the proportions given above, and pass the mixture through the next heated vessel of the series before it passes to the benches.

By this process the carbureting of the water-gas is done at a red heat, or at a degree of temperature near to that of the decomposition of the hydrocarbon. I have found by experiment that the heat required in the benches need not be as high as when the carbureting is done by and at a lower temperature, as the gas is partly fixed in the carburetor by my process. Another advantage in using heavy oil in connection with my invention is that the illuminating-power of the gas remains constant and free from light hydrocarbon vapors.

Having described my invention, what I claim, and desire to secure by Letters Patent of the United States, is—

The process of manufacturing a fixed carbureted water-gas, which consists in carbureting the product of the decomposition of water by incandescent coal with hydrocarbons at their point of decomposition or disassociation, and then combining and fixing the mixture in a separate hot retort or bench, whereby a gas of constant photometric power is obtained free from light hydrocarbon vapor or condensable products, and whereby heavy as well as light hydrocarbons may be employed, substantially as described.

ORAZIO LUGO.

Witnesses:
EBENEZER ELLIS,
ANNIE M. PETERS.